(12) United States Patent
Ljungberg (10) Patent No.: US 9,694,305 B2
(45) Date of Patent: Jul. 4, 2017

(54) SYSTEM AND METHOD FOR SLUDGE REMOVAL IN A CIRCULAR SETTLING TANK

(75) Inventor: Bertil Ljungberg, Fjärås (SE)

(73) Assignee: Nordic Water Products, Västra Frölunda (SE)

( * ) Notice: Subject to any disclaimer, the term of this patent is extended or adjusted under 35 U.S.C. 154(b) by 0 days.

(21) Appl. No.: 14/238,786

(22) PCT Filed: Aug. 16, 2012

(86) PCT No.: PCT/SE2012/050876
§ 371 (c)(1),
(2), (4) Date: Mar. 5, 2014

(87) PCT Pub. No.: WO2013/028123
PCT Pub. Date: Feb. 28, 2013

(65) Prior Publication Data
US 2014/0197117 A1    Jul. 17, 2014

(30) Foreign Application Priority Data
Aug. 23, 2011    (SE) ........................................ 1150760

(51) Int. Cl.
*B01D 21/20* (2006.01)
*F16H 55/10* (2006.01)
(Continued)

(52) U.S. Cl.
CPC ............. *B01D 21/06* (2013.01); *B01D 21/18* (2013.01); *B01D 21/20* (2013.01); *B01D 21/245* (2013.01);
(Continued)

(58) Field of Classification Search
CPC .... B01D 21/0003; B01D 21/06; B01D 21/14; B01D 21/18; B01D 21/20; B01D 21/245; F16H 55/10; F16H 55/17; F16H 55/26
(Continued)

(56) References Cited

U.S. PATENT DOCUMENTS 594,110 A * 11/1897 Higgins .................. F16H 55/10
74/465
616,725 A * 12/1898 O'Reilly ................. F16H 55/10
74/465
(Continued)

FOREIGN PATENT DOCUMENTS

| CN | 2051697 U | 1/1990 |
|----|-----------|--------|
| CN | 229007 Y | 1/1996 |

(Continued)

OTHER PUBLICATIONS

Written Opinion of the European Patent Office, European Patent Application No. 12 825 857.1, mailed Mar. 24, 2015. 2 pages.
(Continued)

*Primary Examiner* — Christopher Upton
(74) *Attorney, Agent, or Firm* — Perkins Coie LLP (57) ABSTRACT

A system for sludge removal in a circular settling tank having a side wall (106) comprises a rotatable drive ring (130) adapted to be interconnected to a scraper arm provided with scraper blades, wherein the drive ring having a plurality of engagement surfaces (134) A traction assembly (140) is fixedly attached to the side wall and comprises a drive wheel (142). By providing a drive wheel with a plurality of engagement rolls (148) adapted to engage the engagement surfaces of the drive ring during rotation of the drive wheel, the drive ring can be rotated essentially without exerting any radial forces on the drive ring.

6 Claims, 13 Drawing Sheets

(51) Int. Cl.
*B01D 21/06* (2006.01)
*B01D 21/24* (2006.01)
*F16H 55/17* (2006.01)
*B01D 21/18* (2006.01)
*F16H 19/04* (2006.01)

(52) U.S. Cl.
CPC ............. *F16H 55/10* (2013.01); *F16H 55/17* (2013.01); *F16H 19/04* (2013.01)

(58) Field of Classification Search
USPC .... 210/803, 523, 528, 530; 74/63, 413, 432, 74/434, 457
See application file for complete search history.

(56) References Cited

U.S. PATENT DOCUMENTS

| | | | | | |
|---|---|---|---|---|---|
| 775,476 | A | * | 11/1904 | Mills | F16H 55/17 74/432 |
| 1,187,267 | A | * | 6/1916 | Cramer | F16H 55/17 74/432 |
| 1,951,462 | A | * | 3/1934 | Wing | B01D 21/06 210/530 |
| 2,110,462 | A | * | 3/1938 | Coberly | B01D 21/06 210/530 |
| 2,149,313 | A | * | 3/1939 | Sayers | B01D 21/06 210/530 |
| 4,859,346 | A | * | 8/1989 | Wood | B01D 21/20 210/528 |
| 5,422,006 | A | * | 6/1995 | Huber | B01D 21/06 210/528 |
| 5,423,980 | A | * | 6/1995 | Casper | B01D 21/14 210/528 |
| 2009/0048051 | A1 | * | 2/2009 | Koleoglou | F16H 55/10 475/183 |

FOREIGN PATENT DOCUMENTS

| | | | |
|---|---|---|---|
| CN | 201249057 Y | | 6/2009 |
| DE | 8316591 U1 | | 10/1983 |
| DE | 29917631 | * | 2/2000 |
| GB | 502469 | * | 3/1939 |
| WO | WO 98/19765 | * | 5/1998 |
| WO | WO 2011/016067 A1 | | 2/2011 |

OTHER PUBLICATIONS

International Search Report issued by the Swedish Patent Office for PCT/SE2012/050876. Mailed Dec. 21, 2012. 5 pages.

* cited by examiner

SYSTEM AND METHOD FOR SLUDGE REMOVAL IN A CIRCULAR SETTLING TANK

TECHNICAL FIELD

The present invention relates generally to a method and a system for sludge removal in a circular settling tank.

BACKGROUND ART

Circular settling tanks are commonly used for treatment of water and wastewater. Water containing particles is introduced into the settling tank and the particles will settle to the bottom of the settling tank where they will form a sludge layer. The influent to the settling tank is divided into an overflow and an underflow. Settling tanks are expected to produce a reasonably clean overflow and a reasonably thick underflow. If the emphasis is on the clean overflow they are often named clarifiers and if the emphasis is on a thick underflow they are often named thickeners. The underflow normally leaves the settling tank through a central outlet in the bottom of the tank. The sludge that has collected on the tank bottom is transported to the underflow outlet by means of at least one sludge scraper. A sludge scraper normally consists of a scraper arm with one or more scraper blades attached. The scraper arm may be fixed to a central vertical shaft. The shaft is provided with a drive motor which rotates the shaft and scraper arm(s). Since the scraper blades are set at an angle relative to the scraper arm a transport of the sludge towards the center will result.

As an alternative to the center drive motor, the scraper arm can be driven from the periphery. In that case it is common to have a drive motor running on a driving wheel along the top of the tank wall. The peripheral motor pulls the scraper arm(s) and gives it a circular motion. The driving force is normally transferred to the scraper arm by a truss.

The peripheral drive can pull scrapers working with a heavy load of sludge, but it has certain disadvantages. For instance, in winter snow and ice will interfere with the operation, the peripheral drive makes it difficult to provide a roof over the settling tank and the truss makes it impossible to install inclined settler plate packs in the settling tank in order to increase settling capacity.

In a prior art system, a drive motor is provided at the periphery of the tank. Three vertical shafts extend vertically downwards to close to the bottom of the settling tank, and at least one shaft is connected to the motor. At the lower end of each shaft a cog wheel is provided. The cog wheels connect with a metal ring that is provided along the periphery of the settling tank, just above the bottom of the tank. The scraper arms are connected to the ring. The ring consists of two ring formed sections arranged one above the other. These sections are connected by a great number of metal pins each enclosed by a piece of plastic tube which can rotate freely around the pins and thereby functions as a bearing enabling the ring to be rotated by use of the cog wheels. Since the pins need to be placed close to each other to engage with the cogs of the cog wheels a great number of pins enclosed with plastic tubes will have to be provided, for a large settling tank up to 1000 pieces. In addition to being connected to the ring the scraper arms are also connected to a central rotating means.

A similar scraper drive exists wherein the metal ring has been exchanged for a ring built up by a number of plastic or rubber elements.

SUMMARY OF INVENTION

An object of the present invention is to provide a system and a method of the kind initially mentioned, wherein the drawbacks of prior art are eliminated or at least minimized. Thus, an object is to provide much simpler, more economical and more reliable sludge scrapers for circular tanks.

According to a first aspect of the invention there is provided a system as defined by the features of the appended claims.

In a preferred embodiment, the engagement surfaces are planar. In this way, the engagement rolls can roll on the engagement surfaces while minimizing the radial forces on the drive ring.

In a preferred embodiment, the engagement surfaces extend radially from the centre of the drive ring, further minimizing the radial forces on the drive ring.

In a preferred embodiment, the drive wheel is star shaped, whereby the engagement rolls can be attached to the drive wheel wherein adjacent engagement rolls are spaced apart.

In a preferred embodiment, six engagement rolls are provided at equal distance from the centre of the drive wheel and at an equal mutual distance. This number of engagement rolls provides good drive characteristics for the drive ring.

Additional preferred embodiments are defined in the dependent claims.

By use of the described system and method, much simpler, more economical and more reliable sludge scrapers for circular tanks can be achieved.

BRIEF DESCRIPTION OF DRAWINGS

The invention is now described, by way of example, with reference to the accompanying drawings, in which.

DESCRIPTION OF EMBODIMENTS

In the following, a detailed description of a method and a system for sludge removal from circular tanks will be given.

Figure 1:
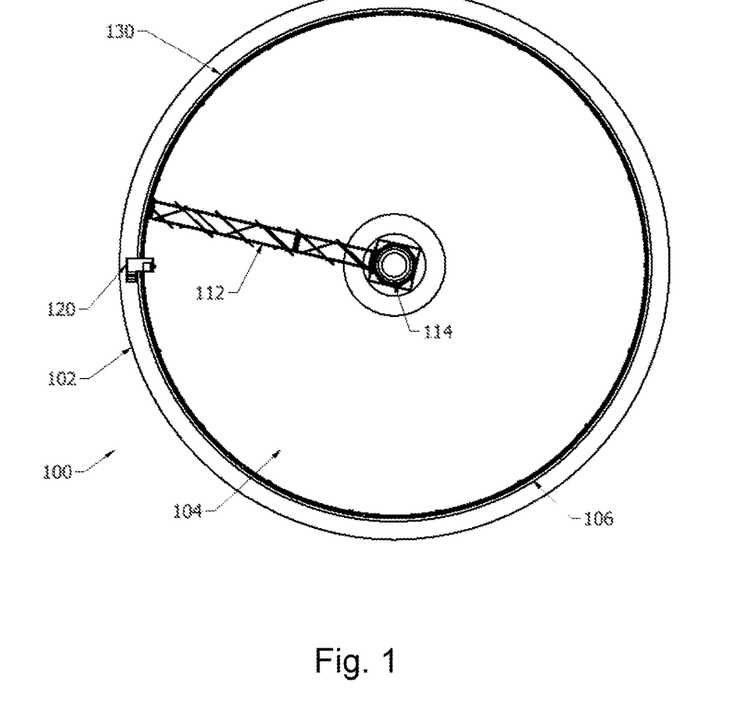
FIGS. 1 and 2 show an overall view of a system according to the invention.
Figure 2:
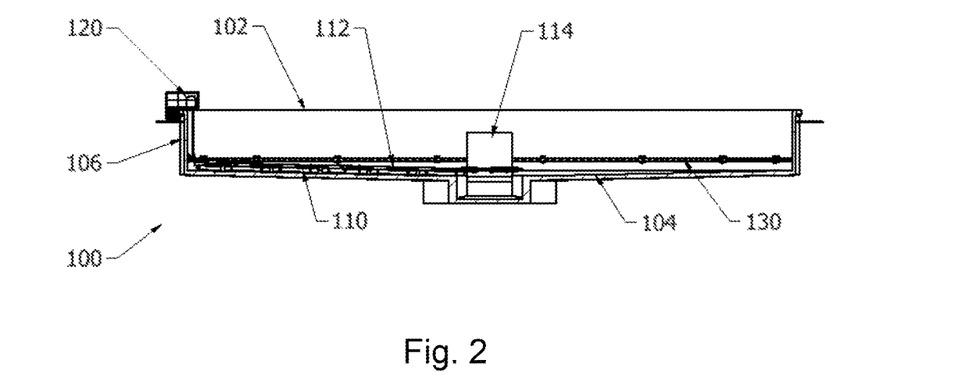

FIGS. 1 and 2 show an overall view of a system according to the invention, generally designated 100. The system, which is mounted in a circular settling tank 102 having a slanting or horizontal bottom 104 an essentially circular side wall 106, as is conventional. The system further comprises blades 110 attached to an arm 112 which in turn is attached to a vertical stub shaft 114. Optionally, skimmers (not shown) are also attached to the arm 112 or alternatively to the stub shaft 114.

Figure 3:
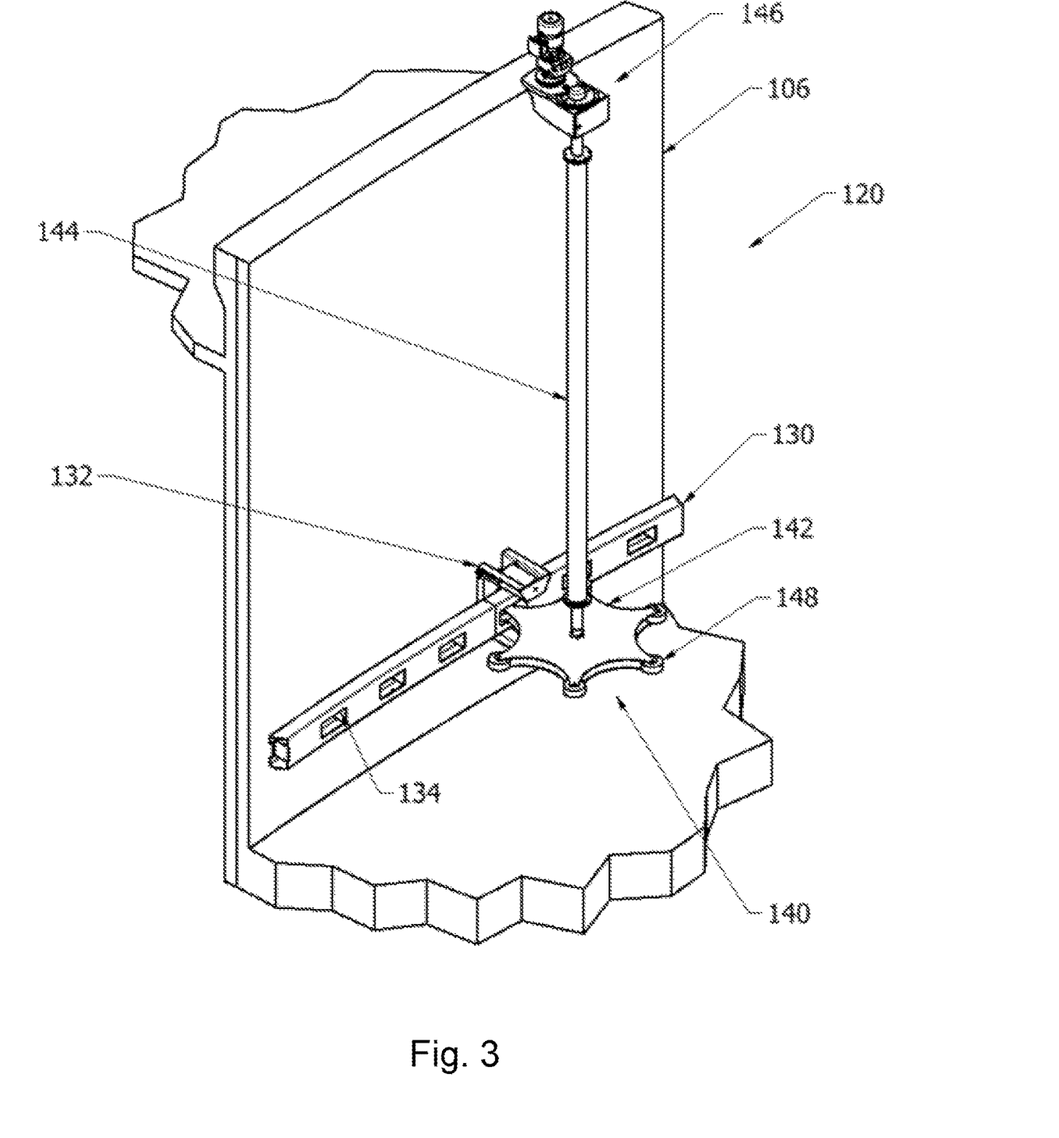
FIG. 3 is an enlarged view of a drive arrangement comprised in the system of FIGS. 1 and 2.

Reference will now be made to FIG. 3, which is an enlarged view of a drive arrangement 120 and which shows part of the circular wall 106 and the bottom 104.

Suspended to the side wall 106, there is provided a rotatable drive ring 130 which runs all around the side wall and which is part of a drive arrangement, generally designated 120. The drive ring 130 may be attached to the side wall by means of guides 132 or the like. The drive arrangement 120 also comprises a traction assembly 140 which is fixedly attached to the circular side wall 106 and which engages the drive ring 120 to, during operation, rotate the drive ring along the periphery of the circular settling tank 102. The drive ring and the traction assembly will be described in more detail below.

The drive ring 130 runs all along the circular wall 106 at the lower portion thereof, preferably about 0.5-1.0 m from the bottom 104. The drive ring is provided with a plurality of engagement surfaces 134 with are spaced apart with predetermined distance, i.e., they are evenly distributed about the periphery of the settling tank 100. The engagement surfaces 134 may, as shown in FIG. 3, be an internal side wall of a respective aperture provided in the drive ring 130, although other configurations are possible as well. However, it is preferred that the engagement surfaces 134 are planar and extend radially from the centre of the drive ring 130 in order to eliminate or at least minimize radial forces on the drive ring 130, as will be explained below.

The traction assembly 140 comprises a drive wheel 142, which is mounted to a vertical drive wheel shaft 144. The drive wheel shaft is adapted to be rotated by a rotation arrangement 146, such as a motor/gear assembly. The drive wheel 142, which in the embodiment shown in the figures is star shaped, is provided with a plurality of engagement wheels or rolls 148. In the preferred embodiment shown in FIG. 3, there are six engagement rolls 148 provided at equal distance from the centre of the drive wheel 142. Adjacent engagement rolls 148 are provided on the drive wheel 142 at an equal mutual distance which is equal to the mutual distance between adjacent engagement surfaces of the drive ring 130. Thereby, these engagement rolls 148 are adapted to engage the engagement surfaces 134 of the drive ring 130, as will be explained in detail below with reference to FIGS. 8a-8f.

Figure 4:
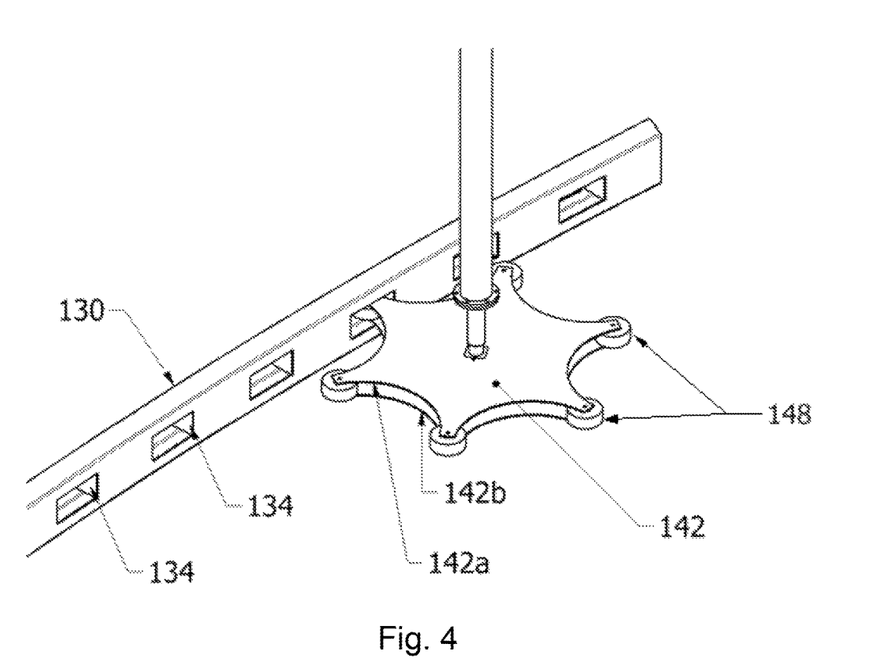
FIG. 4 is a detailed view of a drive ring and a drive wheel comprised in the system of FIGS. 1 and 2.

FIG. 4 is a detailed view of the drive ring 130 and the drive wheel 142 with its engagement rolls 148. It is here seen that in this embodiment the engagement rolls 148 are journalled about a respective roll shaft extending between an upper star shaped plate 142a and a lower star shaped plate 142b. The star shaped plates 142a, b are preferably made of stainless steel or the like.

Figure 5:
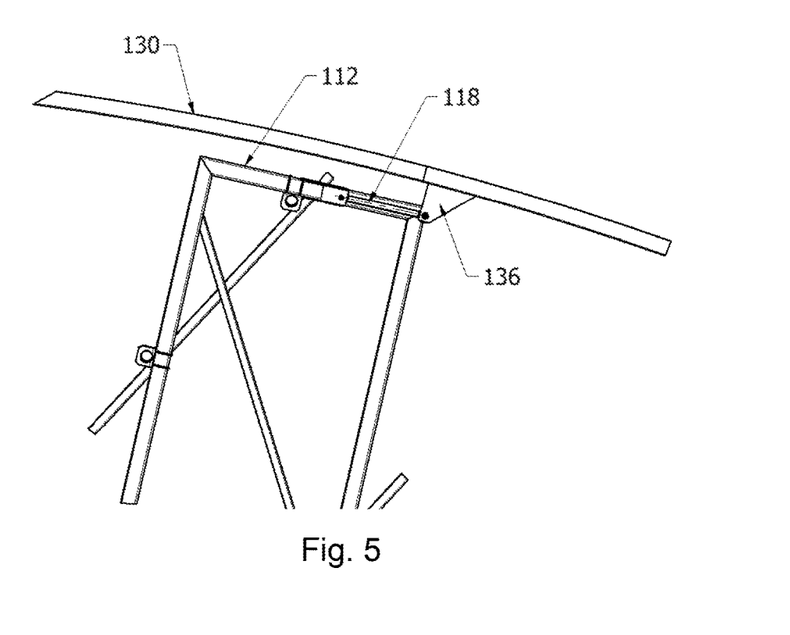
FIG. 5 shows the drive ring of the system connected to a scraper arm.

In FIG. 5 the drive ring 130 is shown connected to the arm 112 by means of a pull rod 118 attached to the drive ring by means of a link arrangement. Thus, the arm 112 and therewith the scraper blades 110 are imparted a circular movement around the circular settling tank, bringing sludge to a sludge pit adapted to collect the sludge for subsequent removal from the tank.

Figure 6:
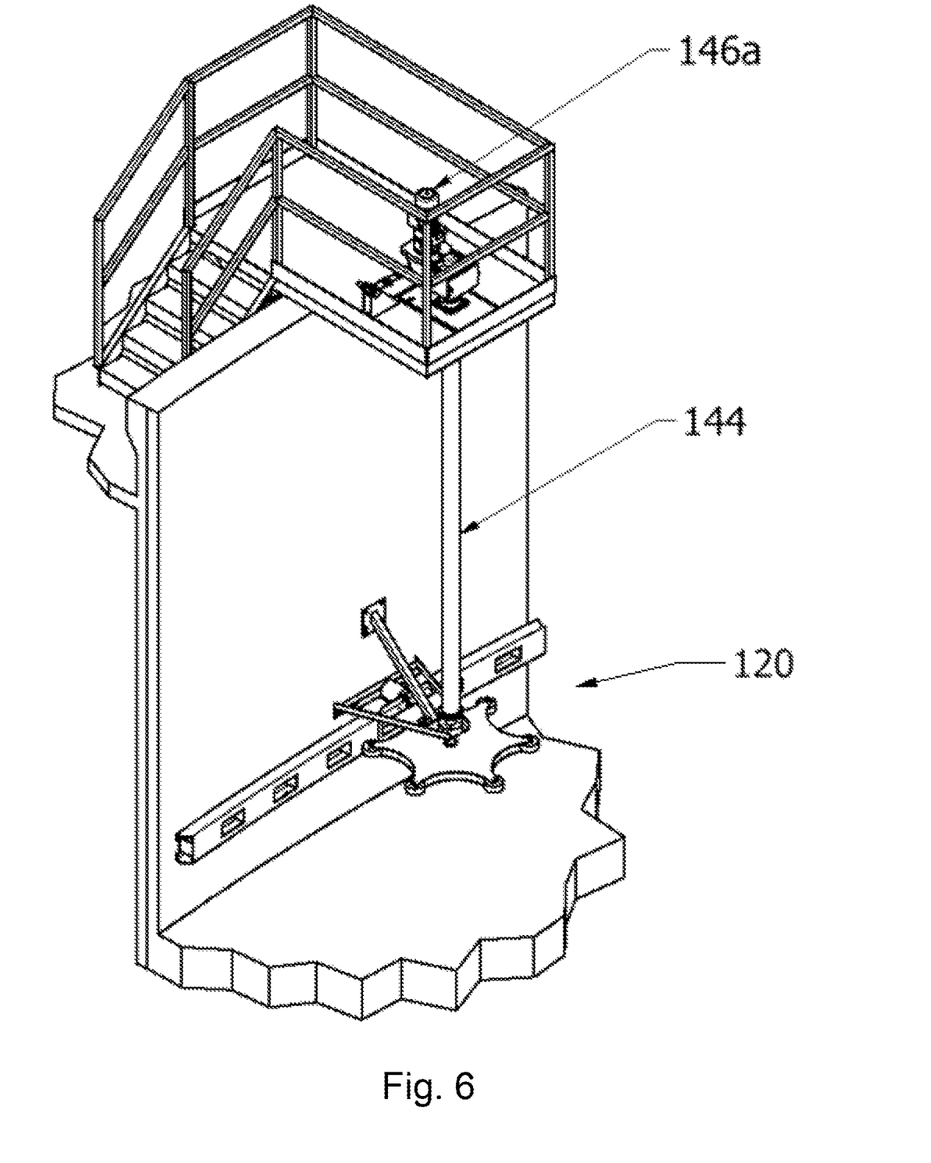
FIG. 6 is an overall view of a drive arrangement including an electric motor.

FIG. 6 is an overall view of the drive arrangement 120 including an electric motor 146a connected to the vertical drive wheel shaft 144 via a gear.

Figure 7:
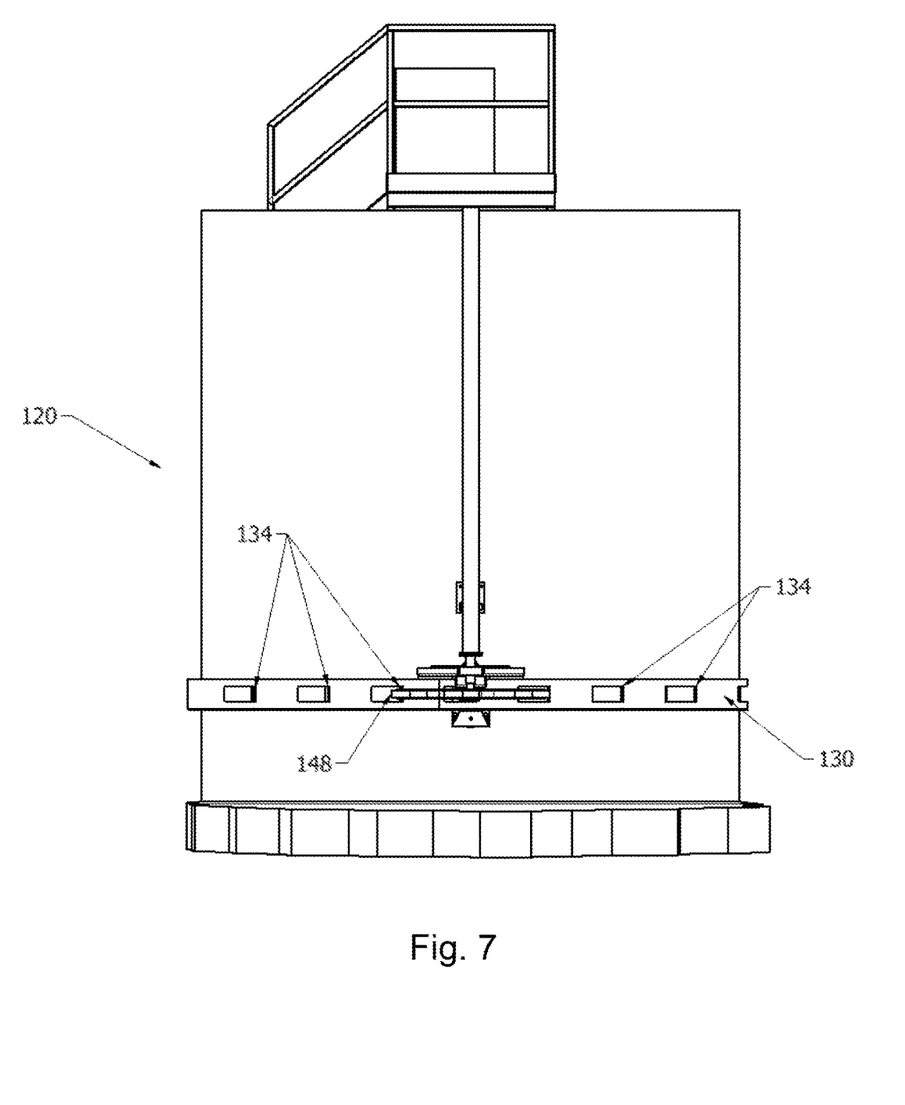
FIG. 7 is a side view showing the alignment between engagement surfaces of the drive ring and engagement rolls of the drive wheel of FIG. 4.

FIG. 7 is a side view of the drive arrangement 120 showing that the engagement rolls 148 are provided in vertical alignment with the drive ring 130 and therewith with the engagement surfaces 134.

The interaction between the drive ring 130 and the traction assembly 140 will now be explained in detail with reference to FIGS. 8a-8f, showing planar views of the drive ring 130 and the drive wheel 142. The six engagement rolls attached to the drive wheel 142 are labeled 148a, 148b . . . 148f in a counter-clockwise direction. Correspondingly, engagement surfaces of the drive ring 130 are labeled 134a, 134b etc. from right to left in the figures.

Figure 8A:
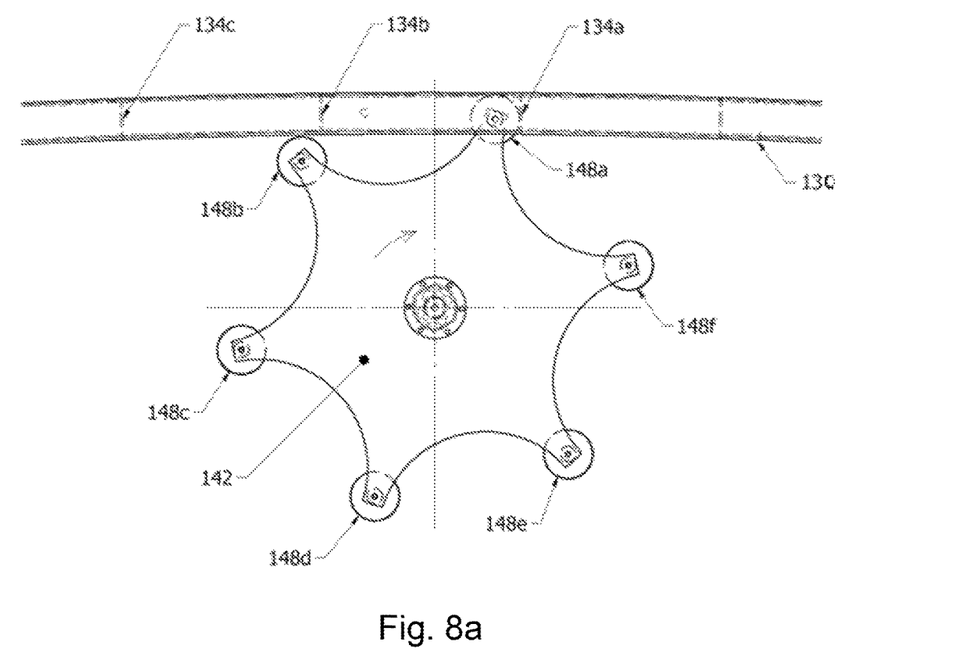
FIGS. 8a-f are planar views showing the interaction between the drive ring and the drive wheel in different rotational positions of the drive wheel.

In an initial position shown in FIG. 8a, a first engagement roll 148a is in engagement with a first engagement surface 134a of the drive ring 130. Since the drive wheel 142 rotates in a clockwise direction, the first engagement roll 148a exerts a force on the first engagement surface 134a. This force is directed to the right in the figure, imparting a movement to the drive ring 130 in a direction to the right in the figure. In other words, the entire drive ring 130 is brought to rotate in a clockwise direction along the side wall 106 of the settling tank.

Since the engagement rolls are journalled about a vertical shaft attached to the drive wheel 142 and the engagement surfaces 134 are planar, essentially no radial forces are exerted on the drive ring 130 by the engagement rolls 148, since the engagement rolls 148 are allowed to roll on the engagement surfaces as the drive wheel 142 turns.

Figure 8B:
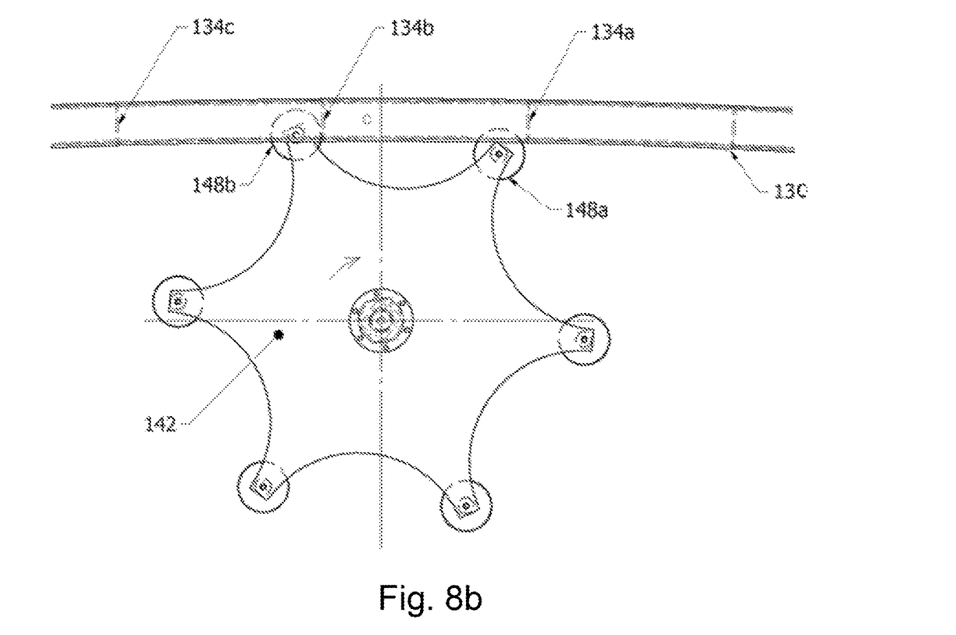

In FIG. 8b, the drive wheel 142 has been rotated clockwise as compared to the position thereof shown in FIG. 8a. During this rotation, the first engagement roll 148a leaves engagement with the first engagement surface 134a while the second engagement roll 148b engages the second engagement surface 134b. In the same way as the first engagement roll 148a exerted a force on the drive ring 130, the second drive roll 148b exerts a force on the drive ring 130 to further move this drive ring to the right in the figure.

Figure 8C:
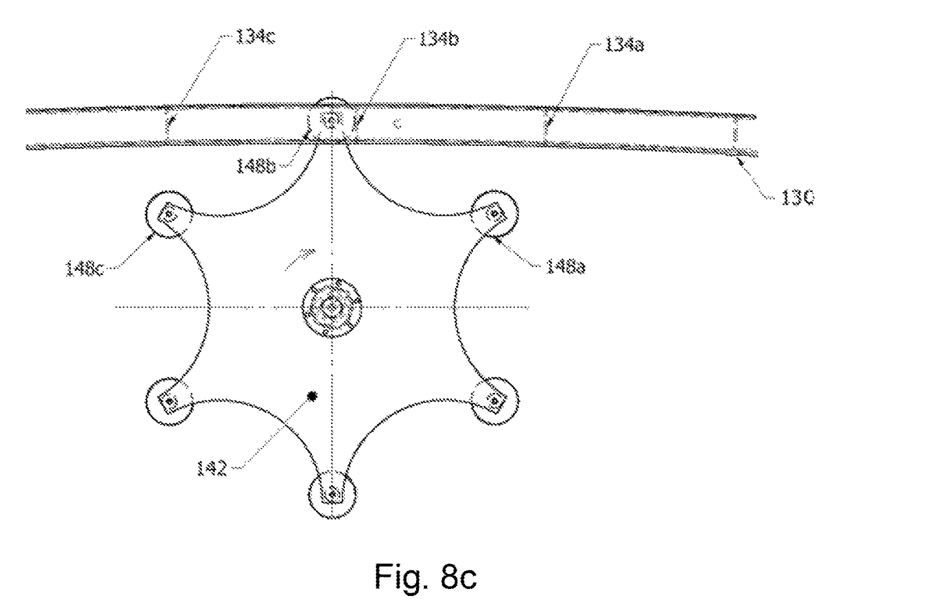

Turning now to FIG. 8c it is seen that the second engagement roll 148b is in maximum engagement with the engagement surface 134b of the drive ring 130, e.g. the part of the drive wheel 142 with this engagement roll is facing the drive ring. In this position, the tangential speed of the engagement roll 148b is at its maximum, i.e. the rotational speed of the drive ring 130 is highest when one of the engagement rolls is in maximum engagement. However, the variation in the rotational speed of the drive ring 130 is sufficiently small not to cause any drawbacks in the operation of the system. This variation may if so desired be eliminated by providing a drive motor with variable speed.

Figure 8D:
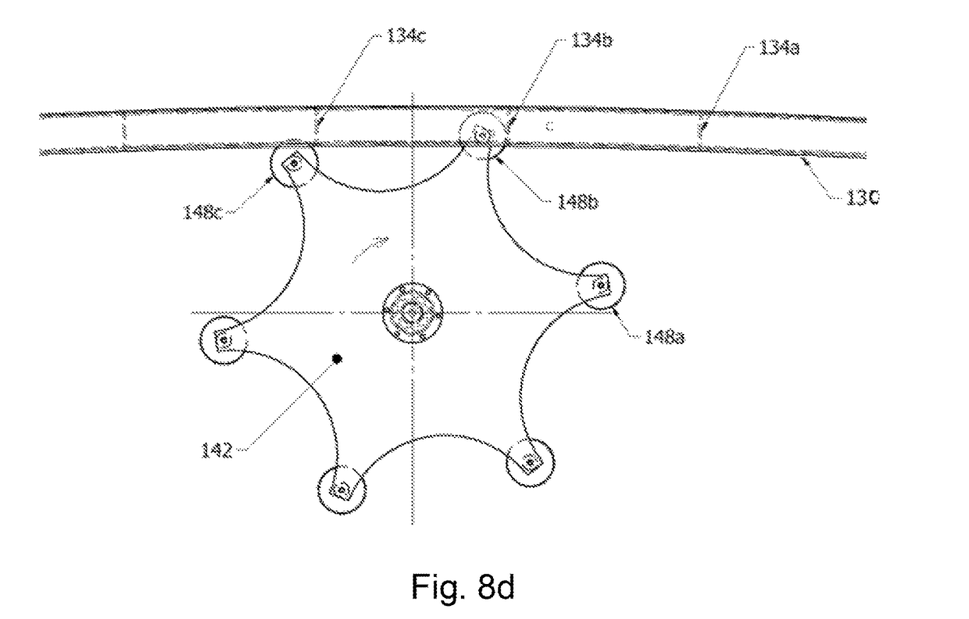

FIG. 8d corresponds to FIG. 8a only with the difference, that the drive wheel 142 has revolved one sixth of a full revolution. In other words, the second engagement roll 148b has replaced the first engagement roll 148a of FIG. 8a.

Figure 8E:
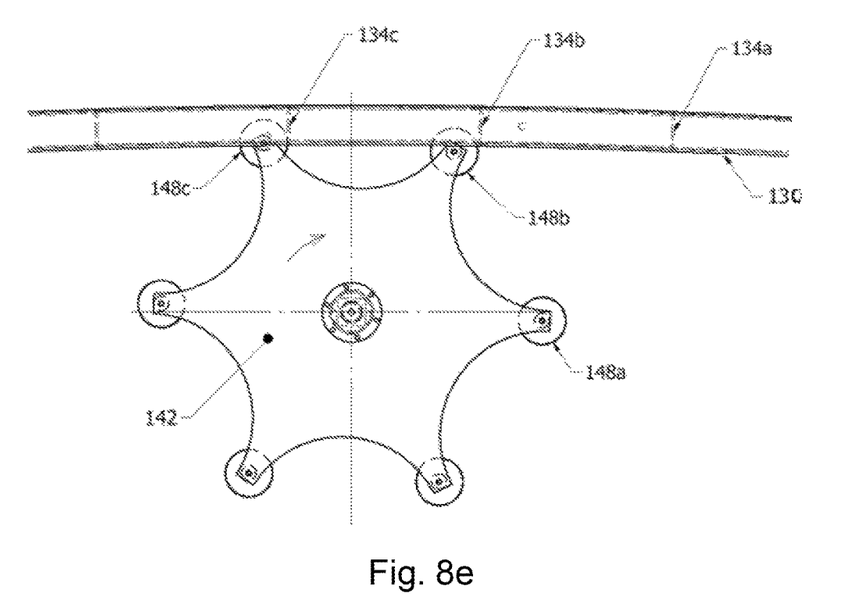

In FIG. 8e, the second engagement roll 148b has just left engagement with the second engagement surface 134b of the drive ring 130 and the third engagement roll 148c has engaged the third engagement surface 134c of the drive ring 130. Due to the mutual distances between adjacent engagement surfaces 134 and engagement rolls 148, respectively, which are all identical, a smooth transition is ensured when one pair of engagement surface/engagement roll leaves mutual contact and another pair of engagement surface/engagement roll comes into mutual contact.

Figure 8F:
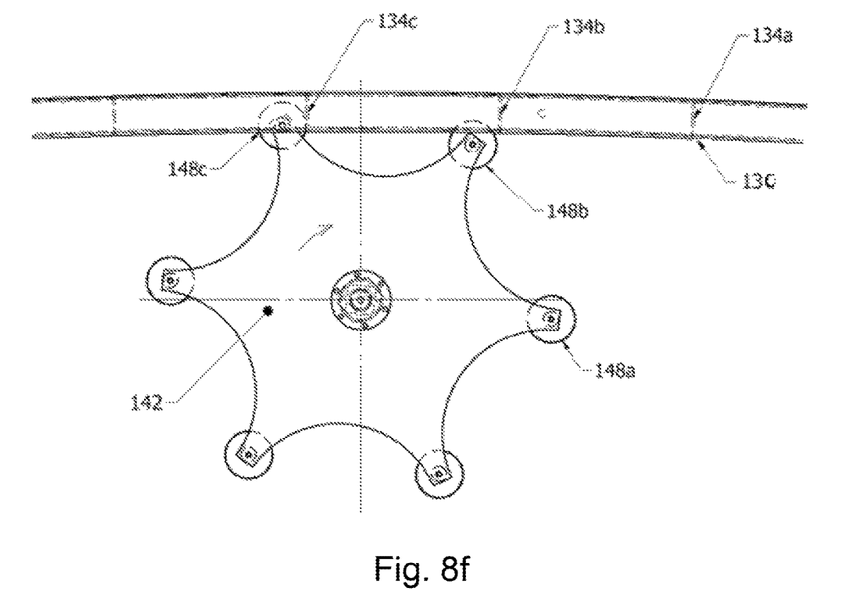

Finally, in FIG. 8f, the third engagement roll 148c functions to apply a force on the engagement surface 134c of the drive ring 130, displacing the engaged ring. This procedure is repeated for the other engagement rolls 148d-f and the corresponding engagement surfaces 134 until the first engagement roll 148a is in the position shown in FIG. 8a, whereafter the drive wheel 142 starts another revolution and so on, until operation is stopped.

Figure 9:
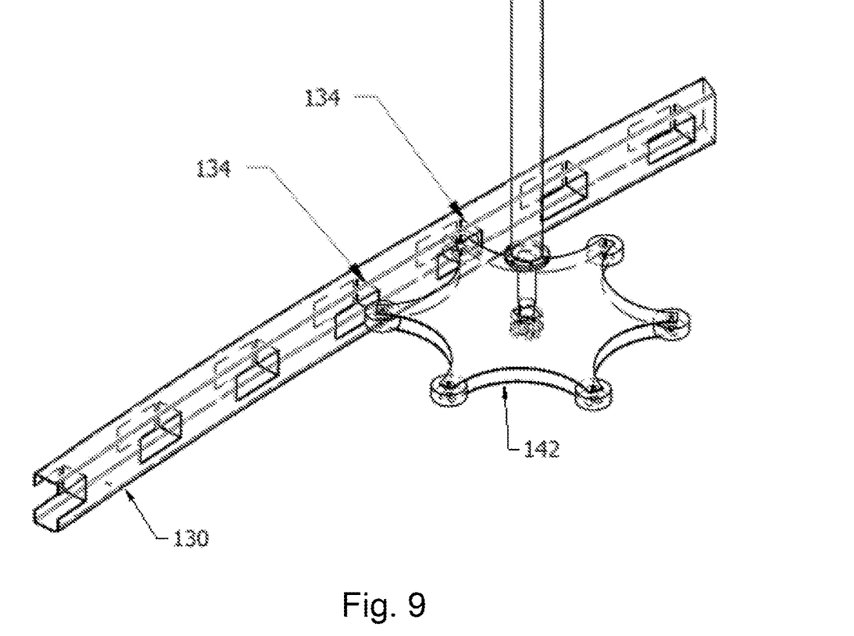
FIGS. 9-18 show different embodiments of the drive ring comprised in the system according to the invention.

FIG. 9 shows a transparent view of the drive ring 130 and the drive wheel 142, showing the engagement surfaces 134 without any obstructing part of the drive ring.

Figure 10:
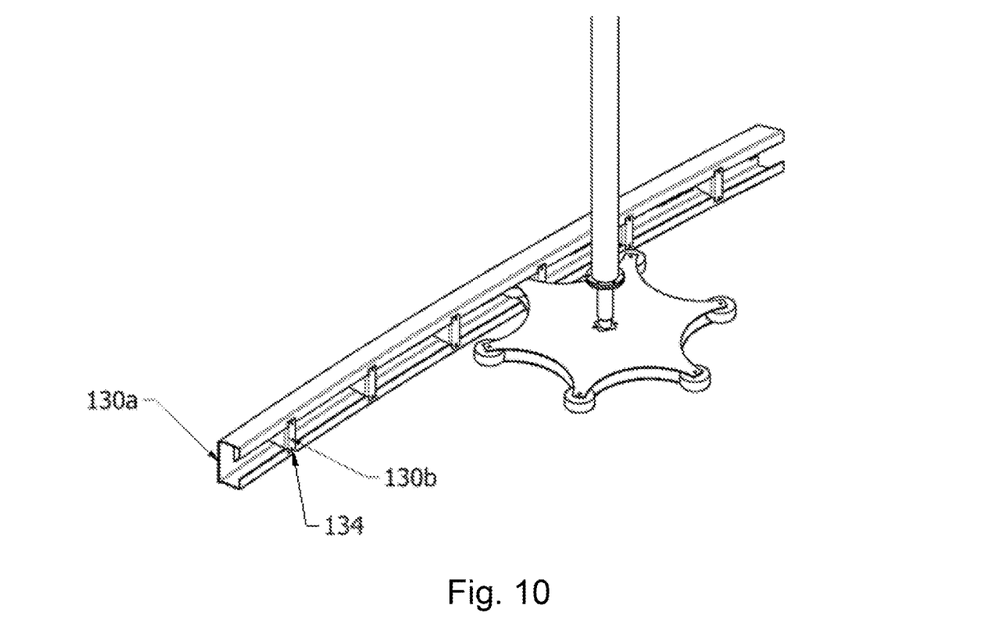

In the drive ring 130 shown in the above described embodiment, the engagement surfaces 134 are made up of a side wall of an opening in the drive ring 130. However, there are many other feasible embodiments, such as the one shown in FIG. 10. In this embodiment, the drive ring 130 is comprised of a C-shaped profile 130a with a plurality of engagement elements 130b bolted to this C-shaped profile. These engagement elements exhibit a planar surface functioning as the engagement surface 134 of the previously explained embodiment.

Figure 11:
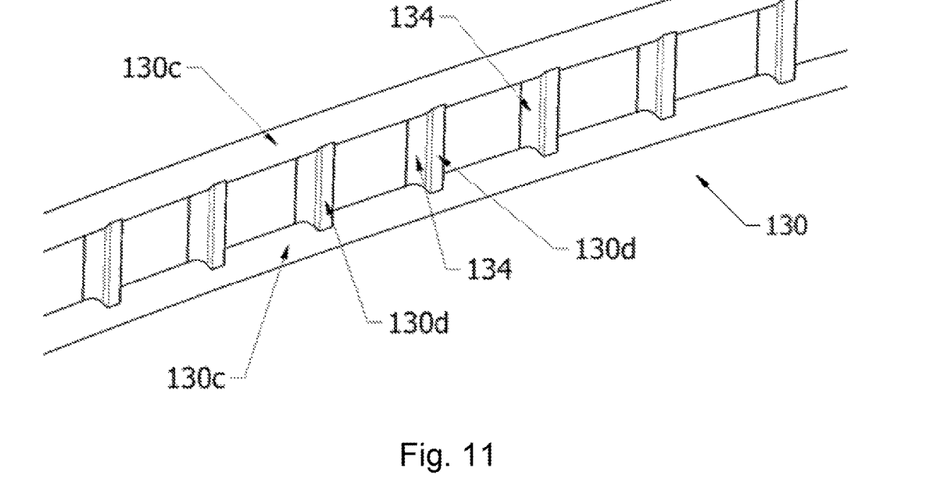

Yet an embodiment of the drive ring 130 will now be described with reference to FIG. 11. In this embodiment, the drive ring 130 is made up of two hollow profiles 130c, preferably with circular cross-sectional shape, which are interconnected by a plurality of equidistant rectangular or square shaped interconnecting hollow profiles 130d providing the engagement surfaces 134 for the engagement rolls 148. In this embodiment, the interconnecting hollow profiles 130d are welded to the circular hollow profiles 130c.

Figure 12:
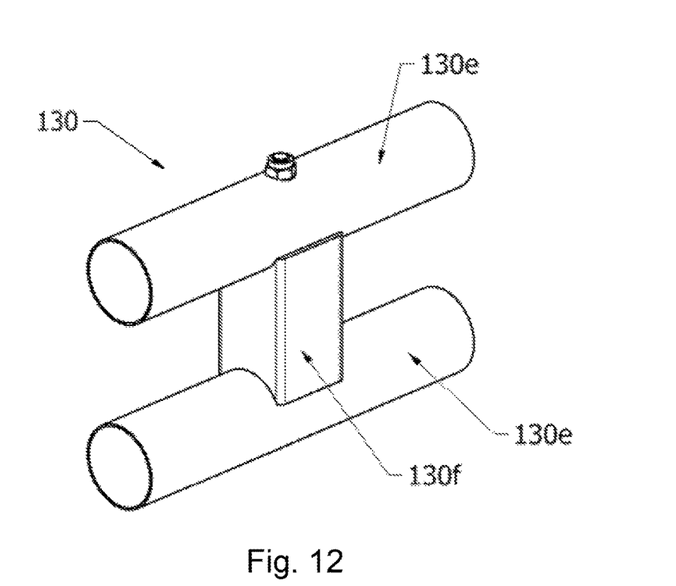

In yet an alternative embodiment of the drive ring 130, see FIG. 12, the drive ring 130 comprises two hollow profiles 130e, preferably with circular cross-sectional shape, as in the previous embodiment. These hollow profiles 130e are interconnected by a plurality of equidistant interconnecting hollow profiles 130f having square or rectangular cross-sectional shape and being bolted to the hollow profiles 130e by means of a respective nut and bolt, with or without a spacer.

Figure 13:
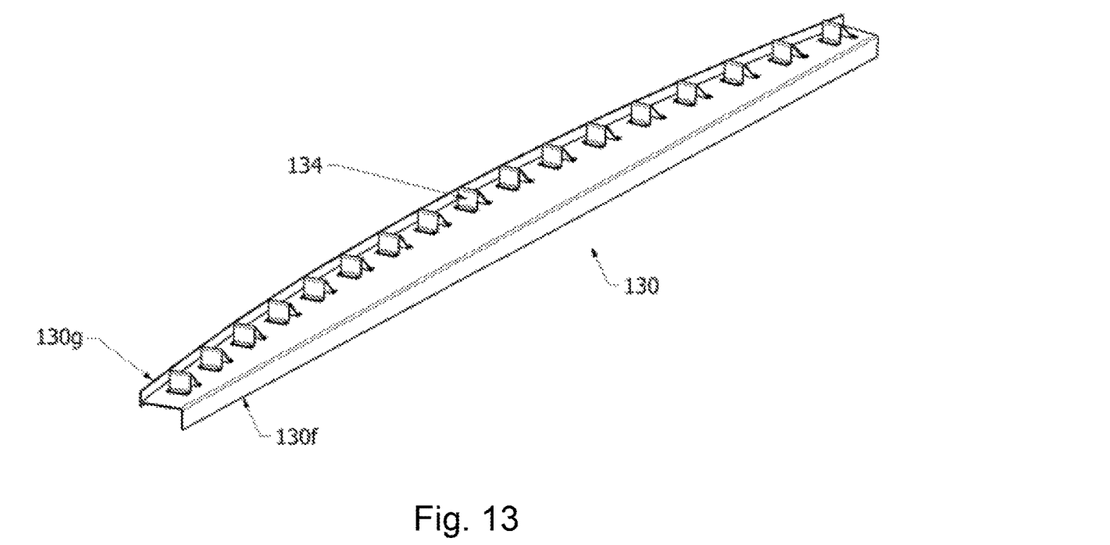

The drive ring 130 can alternatively be provided from a bent metal strip 130f cut to a radius corresponding to the radius of the settling tank. Rolled flat steel 130g is welded to the bent metal strip 130f to together form the drive ring 130. This drive ring is provided with a plurality of equidistant bent and bolted or welded metal sheets, each having an essentially planar surface forming the respective engagement surface 134.

Figure 14:
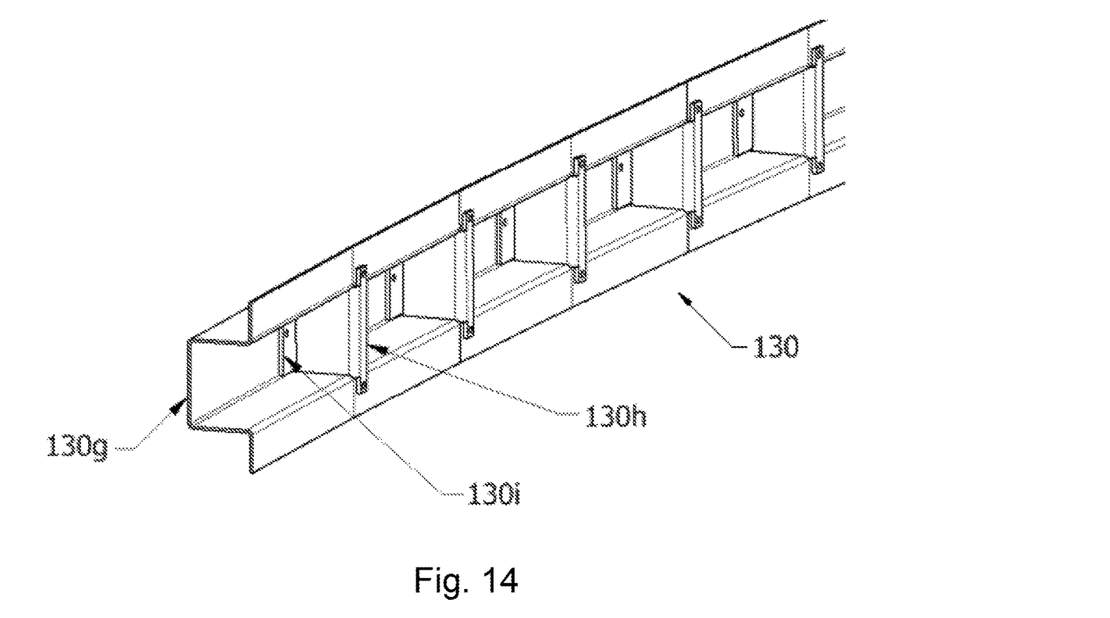

FIG. 14 shows a drive ring 130 formed from a bent metal sheet 130g. The bent metal sheet 130g has a cross-sectional shape with a bottom surface and two surfaces facing inward towards the center of the settling tank. A plurality of equidistant elongated metal sheets 130h are attached, preferably bolted to the two surfaces facing inward. The engagement surfaces are provided by bent sheets 130i which are attached, preferably bolted to the bottom surface of the bent metal sheet 130g and attached, preferably welded to the elongated metal sheets 130h.

Figure 15:
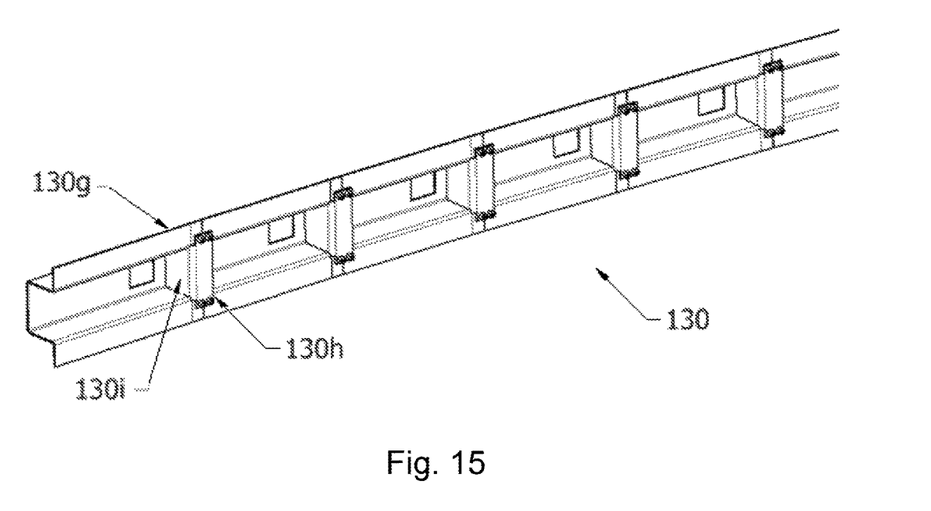

The embodiment of FIG. 14 can be modified in that the elongated metal sheets 130h and the bent sheets 130i can be combined into one single bent metal sheet, see FIG. 15.

Figure 16:
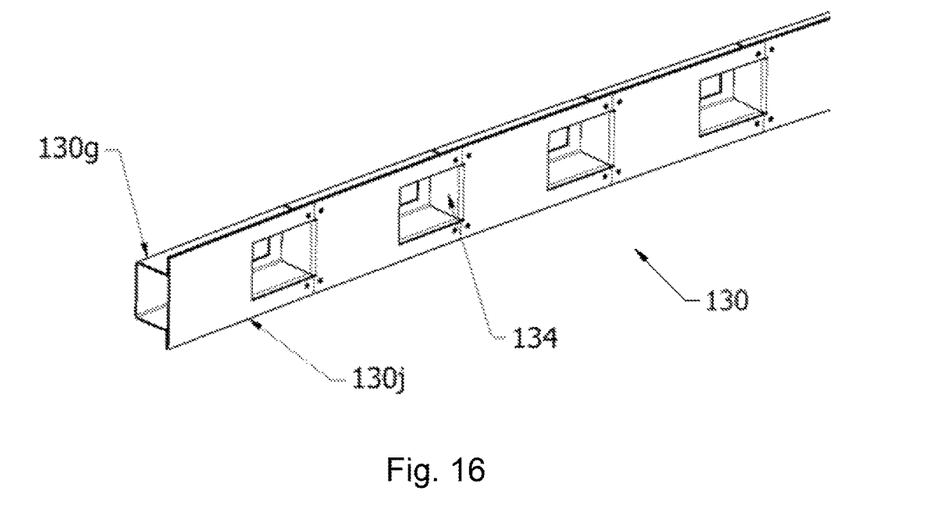

It will be realized that the features of the above described different embodiments of the drive ring 130 can be combined in different ways. Thus, in FIG. 16 a drive ring 130 is shown, which comprises a bent metal sheet 130g, like in FIGS. 14 and 15, provided with a front plate or sheet 130j having apertures with side walls providing the engagement surfaces 134.

Figure 17:
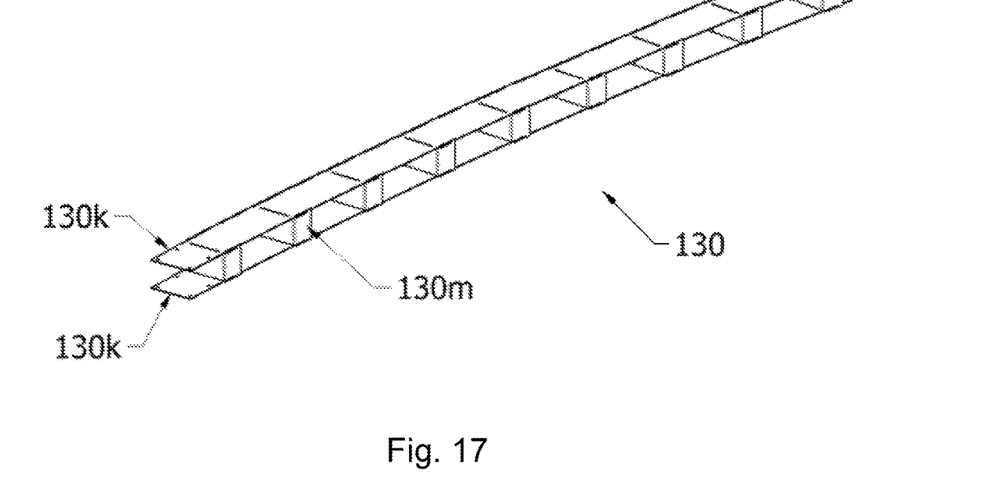
Figure 18:
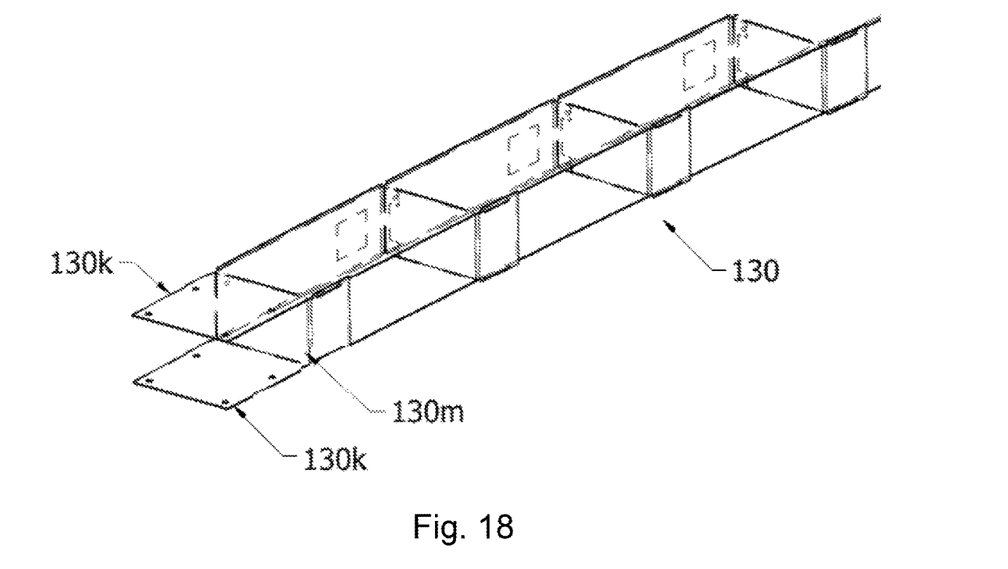

In FIGS. 17 and 18, there is shown an alternative embodiment of the drive ring 130 wherein it comprises two essentially planar metal sheets 130k which have been cut to the appropriate ring radius, i.e., to fit along the inside of the side wall 106, such as by laser cutting, see FIG. 17. The two essentially planar metal sheets 130k are interconnected by equidistant metal sheets 130m, which are bolted to each other. This is shown more clearly in FIG. 18, wherein obstructing parts have been made transparent to show the interconnecting metal sheets 130m.

A system for sludge removal in a circular settling tank has been described. The basic principle of providing engagement surfaces on the drive ring and engagement rolls rotating the drive ring can be generalized to a method of rotating a circular object, such as a rotatable drive ring of a circular settling tank. This method comprises the following steps: providing equidistant engagement surfaces (134) on the circular object, providing a drive wheel with a plurality of engagement rolls (148) adapted to engage the engagement surfaces (134), and rotating the drive wheel (142).

Preferred embodiments of a system for sludge removal in a circular settling tank and a method of rotating a circular object have been described. It will be realized that these embodiments can be varied within the scope of the attached claims without departing from the inventive idea. Thus, it will be realized that the features of the different embodiments, such as the configuration of the drive ring 130, can be combined in different ways. Also, although the system is shown with only one scraper arm 112, it will be realized that a plurality of scraper arms can be provided. Also, there could be one or more skimmers being rotated by the traction assembly 140. The described embodiments include an electric motor for driving the system. Alternatively, a hydraulic motor may be provided for driving the system, either positioned at the top of the tank or at the bottom thereof.

In the described embodiments, the drive wheel is provided with six engagement rolls, but it is realized that as few as three engagement rolls can be provided and many more engagement rolls as well, as long as they are adapted for engagement with the engagement surfaces of the drive ring.

The invention claimed is:

1. A system for sludge removal in a circular settling tank having a side wall, the system comprising:
    a rotatable drive ring adapted to be connected to a scraper arm provided with scraper blades, the drive ring having a plurality of planar engagement surfaces,
    a traction assembly comprising a drive wheel,
    wherein the drive wheel is provided with a plurality of engagement rolls adapted to engage the engagement surfaces of the drive ring during rotation of the drive wheel.

2. The system according to claim 1, wherein the engagement surfaces extend radially from the centre of the drive ring.

3. The system according to claim 1, wherein six engagement rolls are provided at equal distance from the center of the drive wheel and spaced apart.

4. The system according to claim 2, wherein the equal mutual distance between adjacent engagement rolls is equal to the mutual distance between adjacent engagement surfaces of the drive ring.

5. The system according to claim 1, wherein the drive wheel is star shaped.

6. The system according to claim 1, wherein the drive ring comprises any of the following:
    a C-shaped profile with a plurality of engagement elements bolted to the C-shaped profile,
    two hollow profiles, which are interconnected by a plurality of equidistant, interconnecting hollow profiles providing the engagement surfaces,
    a bent metal strip cut to a radius corresponding to the radius of the settling tank, wherein flat steel is welded to the bent metal strip, and a plurality of equidistant bent and bolted or welded metal sheets, each having an essentially planar surface forming the respective engagement surface,
    a bent metal sheet having a cross-sectional shape with a bottom surface and two surfaces facing inward towards the center of the settling tank, and a plurality of equidistant elongated metal sheets which are attached to the two surfaces facing inward, and bent sheets which are attached to the bottom surface of the bent metal sheet and attached to the elongated metal sheets, and two essentially planar metal sheets with the appropriate ring radius, wherein the two essentially planar metal sheets are interconnected by equidistant metal sheets.

* * * * *